(12) United States Patent
Ono (10) Patent No.: US 6,170,925 B1
(45) Date of Patent: Jan. 9, 2001

(54) RUBBER CRAWLER

(75) Inventor: Yoshihiko Ono, Yokohama (JP)

(73) Assignee: Bridgestone Corporation, Tokyo (JP)

( * ) Notice: Under 35 U.S.C. 154(b), the term of this patent shall be extended for 0 days.

(21) Appl. No.: 09/181,668

(22) Filed: Oct. 29, 1998

(30) Foreign Application Priority Data

Oct. 29, 1997 (JP) .................................................. 9-314452
Apr. 8, 1998 (JP) .................................................. 10-095934

(51) Int. Cl.⁷ .................................................. B62D 55/24
(52) U.S. Cl. .................................................. 305/177; 305/171
(58) Field of Search .................................................. 305/165, 167, 305/170, 171, 173, 174, 175, 177

(56) References Cited

U.S. PATENT DOCUMENTS

| 5,131,728 | * | 7/1992 | Katoh et al. | 305/174 |
| 5,145,242 | * | 9/1992 | Togashi | 305/171 |
| 5,308,155 | * | 5/1994 | Katoh | 305/174 |
| 5,380,076 | * | 1/1995 | Hori | 305/171 |
| 5,522,655 | * | 6/1996 | Katoh | 305/167 |
| 5,593,218 | * | 1/1997 | Katoh et al. | 305/174 |

FOREIGN PATENT DOCUMENTS

| 490829 A1 | | 6/1992 | (EP) . | |
| 732257 A1 | | 9/1996 | (EP) . | |
| 358071276 | * | 4/1983 | (JP) | 305/174 |
| 358093679 | * | 6/1983 | (JP) | 305/171 |
| 358152682 | * | 9/1983 | (JP) | 305/174 |
| 401240384 | * | 9/1989 | (JP) | 305/177 |
| 403235768 | * | 10/1991 | (JP) | 305/174 |
| 403248975 | * | 11/1991 | (JP) | 305/176 |
| 403284485 | * | 12/1991 | (JP) | 305/177 |
| 404243673 | * | 8/1992 | (JP) | 305/177 |
| 99/12799 | | 3/1999 | (WO) . | |

* cited by examiner

Primary Examiner—S. Joseph Morano
Assistant Examiner—Long Bao Nguyen
(74) Attorney, Agent, or Firm—Sughrue, Mion, Zinn, Macpeak & Seas, PLLC

(57) ABSTRACT

A rubber crawler has a rubber elastomer constituting a main body of the crawler, at least one metal core buried in the rubber elastomer and extending in a widthwise direction perpendicular to a running direction of the crawler, and at least one rubber lug formed on an outer peripheral face of the rubber elastomer. An element is applied to each widthwise end of the metal core to improve the durable life of the crawler.

10 Claims, 11 Drawing Sheets

FIG_1
PRIOR ART

FIG_2
PRIOR ART

FIG_3
PRIOR ART

FIG_8

FIG. 9

FIG_10

FIG_11

FIG_12

RUBBER CRAWLER

BACKGROUND OF THE INVENTION

1. Field of the Invention

This invention relates to a novel rubber crawler, and more particularly to a rubber crawler having a structure for preventing the occurrence of crack or breakage in each of the widthwise edge portions of rubber in the crawler.

2. Description of Related Art

Figure 1:
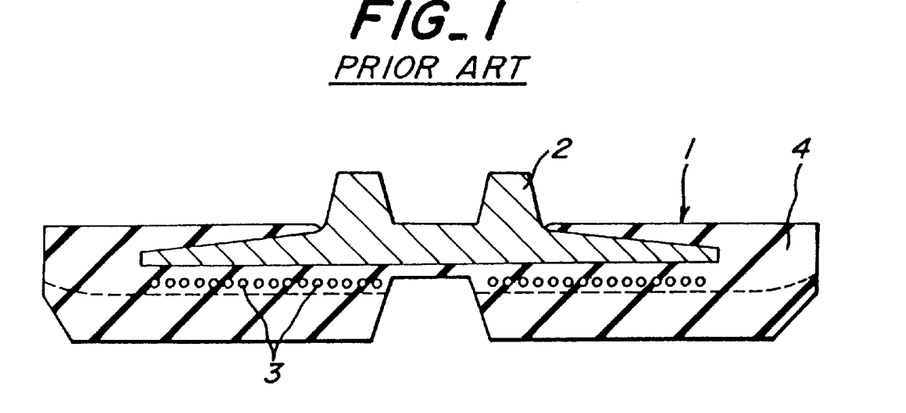
FIG. 1 is a diagrammatically section view of an embodiment of the conventional rubber crawler.
Figure 2:
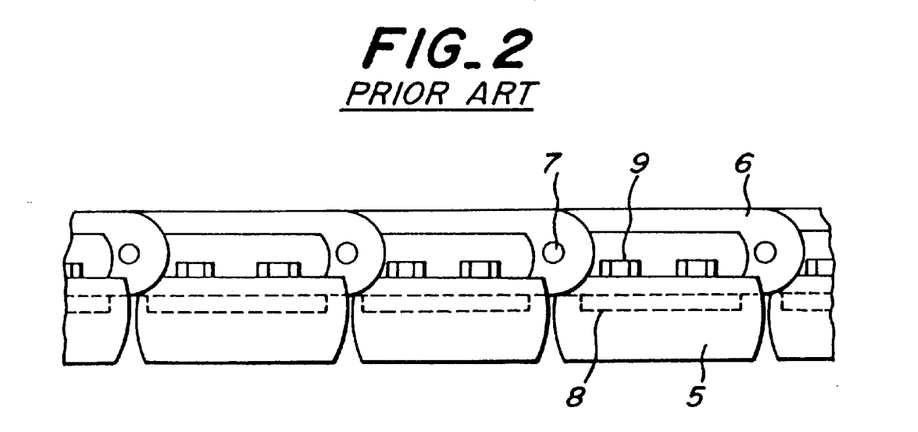
FIG. 2 is a diagrammatically section view of another embodiment of the conventional rubber crawler.

There are well-known and widely used two types of rubber crawlers having structures shown in FIG. 1 and FIG. 2. The first type rubber crawler shown in FIG. 1 comprises an endless rubber belt 1, a plurality of core metal pieces 2 arranged and buried at predetermined intervals in the longitudinal direction of the belt 1, and steel cords 3 arranged to cover the outer surface of the metal pieces 2 and buried in the longitudinal direction of the belt 1. Since a widthwise length of the metal piece 2 is shorter than a full width of the belt 1, widthwise edge portions 4 made from only rubber are formed in both sides of the belt 1. On the other hand, the second type rubber crawler shown in FIG. 2 comprises rubber pads 5 fixed to links 6, which being axially supported by pins 7 form an endless structure, through metal crawler blocks 8 and bolts and nuts 9. In the latter case, a widthwise length of the rubber block 8 is shorter than a full width of the rubber pad 5, so that widthwise edge portions made from only rubber are formed in both sides of the rubber pad 5.

Figure 3:
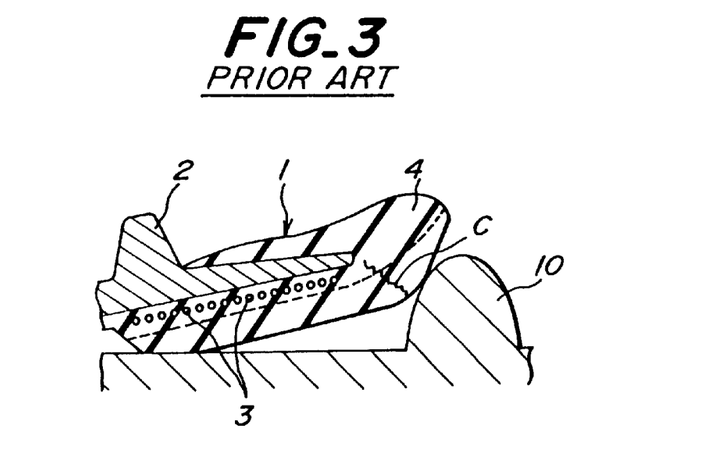
FIG. 3 is a partial section view illustrating a state of riding the conventional rubber crawler on a curb of a footpath to cause cracking.

In general, the widthwise edge portion of the core metal piece has a vertically cut shape at its widthwise edge and front and back edges and is the most flexible portion of the rubber crawler, so that deformation strain is liable to be most caused in the widthwise edge portion at a use state of the rubber crawler. For example, when the rubber crawler contacts with or rides on protrusions such as pebbles, stone pieces, and the like scattered on a running road or a curb of a footpath as shown in FIG. 3, the widthwise edge portion 4 is sandwiched between the core metal piece 2 (or metal crawler block) and the curb 10 and shearing force strongly and repeatedly acts to the widthwise edge of the core metal piece during the running of the rubber crawler to thereby create crack C from the vicinity of such an edge toward an outer surface of the widthwise edge portion 4. See FIG. 3 a crack grows toward the side of contacting with ground and further toward the front and back sides of the widthwise edge portion due to repetition of deformation stress to finally cause breakage of the widthwise edge portion. As a result, the durability of rubber constituting the widthwise edge portion and hence service life of the rubber crawler are undesirably degraded.

SUMMARY OF THE INVENTION

It is, therefore, an object of the invention to solve the afore-mentioned problem of the conventional rubber crawler and to provide a novel rubber crawler capable of reducing or preventing the occurrence of cracks or breakage in the widthwise edge portions of rubber due to the contacting with or riding on the protrusion scattered on road or the curb of the footpath.

According to the invention, there is the provision of a rubber crawler comprising a rubber elastomer constituting a main body of the crawler, at least one metal core buried in the rubber elastomer and extending in a widthwise direction perpendicular to a running direction of the crawler, and at least one rubber lug formed on an outer peripheral face of the rubber elastomer, wherein each widthwise end portion of the metal core and front and back edge portions near to the widthwise end thereof in the running direction are inclined at a ground contacting side toward an inner peripheral side of the crawler to form a bow-shaped section in each of both widthwise ends of the metal core.

In a preferable embodiment of the invention, the rubber elastomer is an endless rubber belt or a rubber pad.

In another preferable embodiment of the invention, an inclination angle of the bow-shaped section with respect to an outer horizontal peripheral face of the metal core is 15–45°, preferably 20–35°. Particularly, an inclination angle of the widthwise end of the metal core in the bow-shaped section with respect to the outer horizontal face thereof is 15–45° and an inclination angle of each of the front and back edges of the metal core in the bow-shaped section is approximately 90°.

In the other preferable embodiment of the invention, a length of the rubber lug in the widthwise direction at the ground contacting face is longer than a distance between the bow-shaped sections at both widthwise ends of the metal core.

In a further preferable embodiment of the invention, a rubber protruding portion covering each of the bow-shaped sections of the metal core is formed on an inner peripheral side of the crawler.

In a still further preferable embodiment of the invention, the bow-shaped section is provided with an outside-inside path. In another preferable embodiment of the invention, when the rubber elastomer is an endless rubber belt, a row of plural steel cords arranged side by side is buried in the rubber elastomer along an outer surface of the metal core to extend these steel cords in the circumferential direction of the rubber elastomer and each of outermost steel cords in the steel cord row is located inward from the widthwise end of the metal core by not less than 15 mm.

In the other preferable embodiment of the invention, an edge of a plane surface in a widthwise end portion of the rubber elastomer facing to ground is located outward from an outer surface of the metal core.

BRIEF DESCRIPTION OF THE DRAWINGS

The invention will be described with reference to the accompanying drawings, wherein.

DESCRIPTION OF PREFERRED EMBODIMENTS

Figure 4:
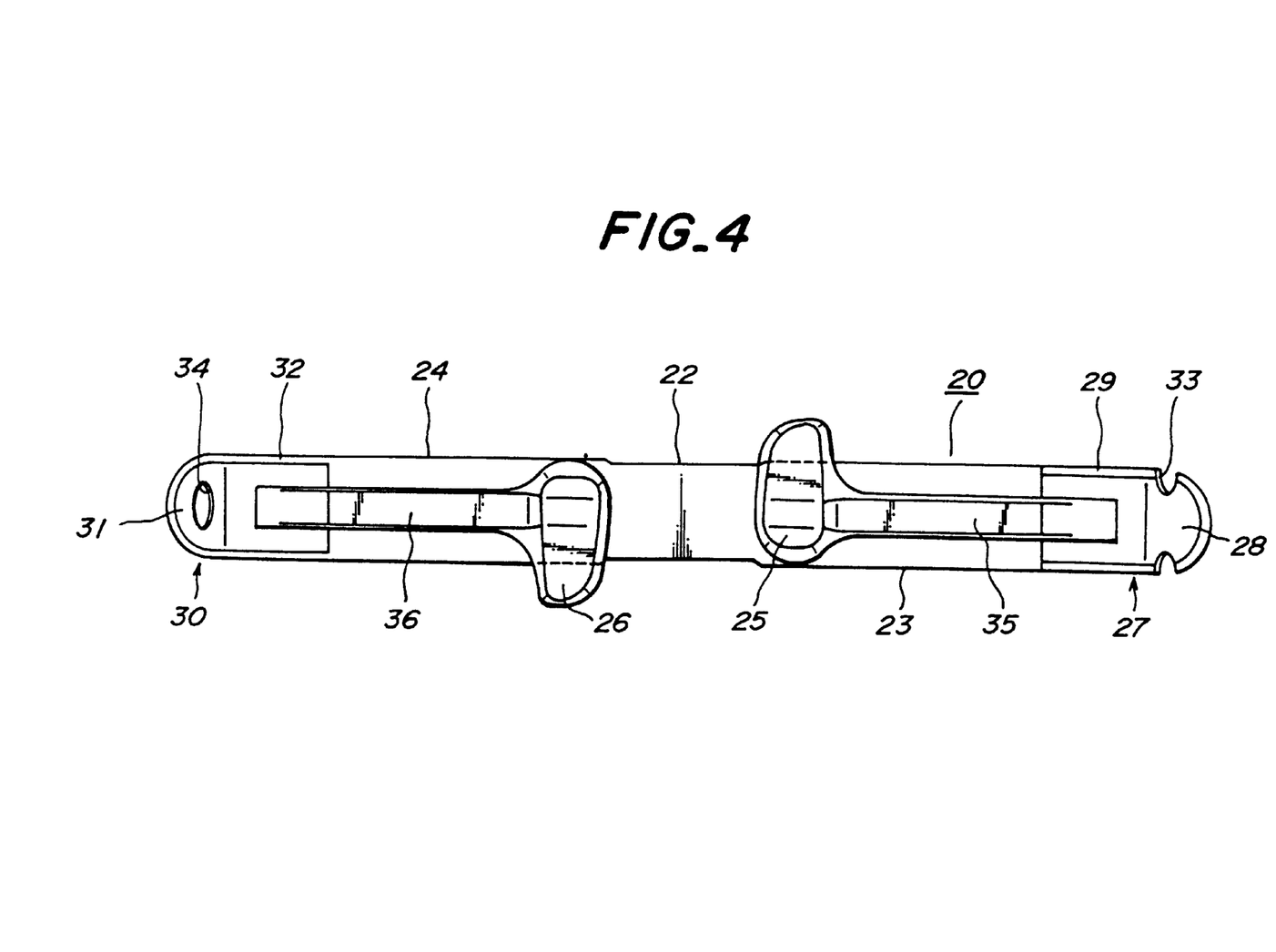
FIG. 4 is a plan view of a first embodiment of the metal core used in the rubber crawler according to the invention.
Figure 5:
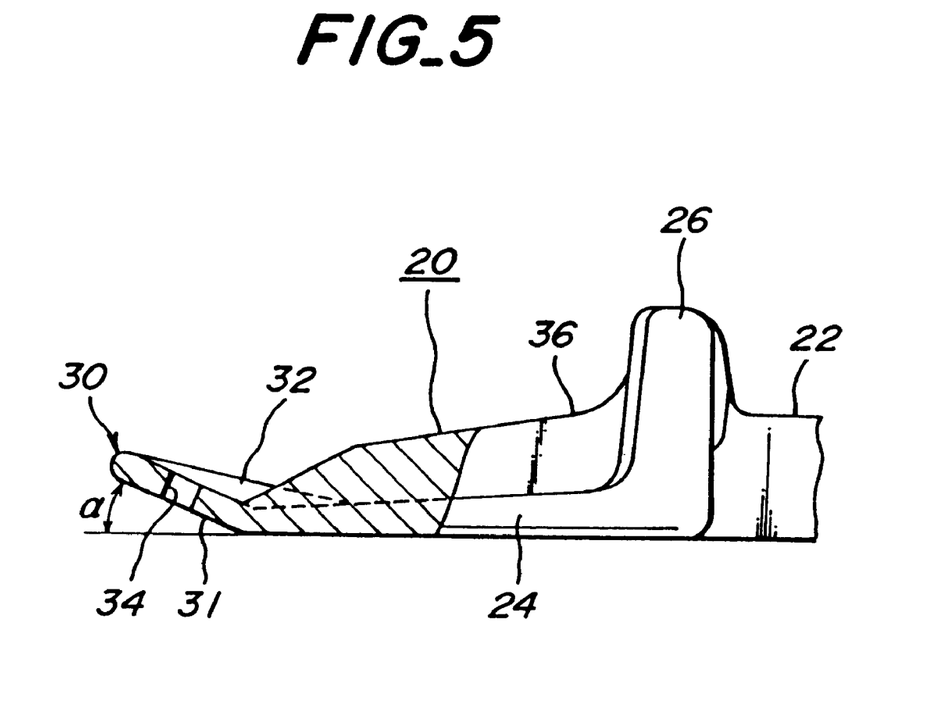
FIG. 5 is a left-half front view partly shown in section of the first embodiment of the metal core.

In FIGS. 4 and 5 is shown a first embodiment (20) of the metal core used in the first type rubber crawler according to the invention. The metal core 20 comprises a portion 22 engaging with a sprocket (not shown), a pair of wing portions 23, 24 formed on both sides of the sprocket engaging portion 22, a pair of projections 25, 26 sandwiching the sprocket engaging portion 22 and arranged in zigzag, a bow-shaped section 27 consisting of a slant portion 28 formed by inclining a longitudinal end of the wing portion 23 toward an inner peripheral side of the crawler and slant portions 29 formed by inclining front and back edges of the wing portion 23 in the vicinity of the widthwise end thereof toward the inner peripheral side of the crawler, and a bow-shaped section 30 consisting of a slant portion 31 formed by inclining a longitudinal end of the wing portion 24 toward an inner peripheral side of the crawler and slant portions 32 formed by inclining front and back edges of the wing portion 24 in the vicinity of the widthwise end thereof toward the inner peripheral side of the crawler.

Furthermore, each of the bow-shaped sections 27, 30 is provided with an outside-inside path 33, 34 communicating an outer surface of the bow-shaped section 27, 30 with an inner surface thereof, in which the path 33 is a notch portion formed in both sides of the bow-shaped section 27 and the path 34 is a through-hole formed in the bow-shaped section 30.

Moreover, numerals 35, 36 are ribs formed on the wing portions 23, 24 from the vicinity of the longitudinal end thereof toward the projections 25 and 26, respectively.

Figure 6:
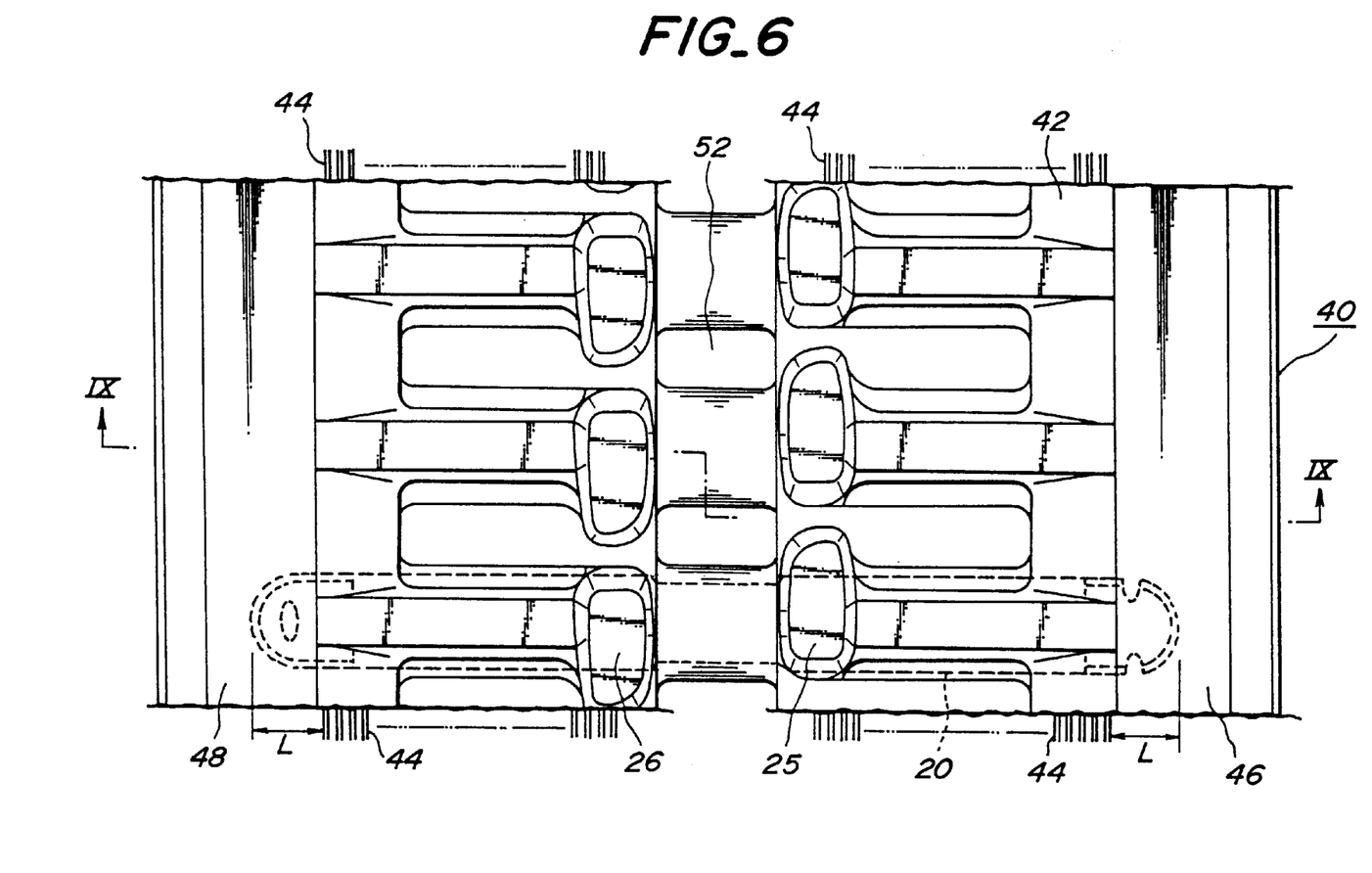
FIG. 6 is a plan view of a first embodiment of the rubber crawler according to the invention using the first embodiment of the metal core.
Figure 7:
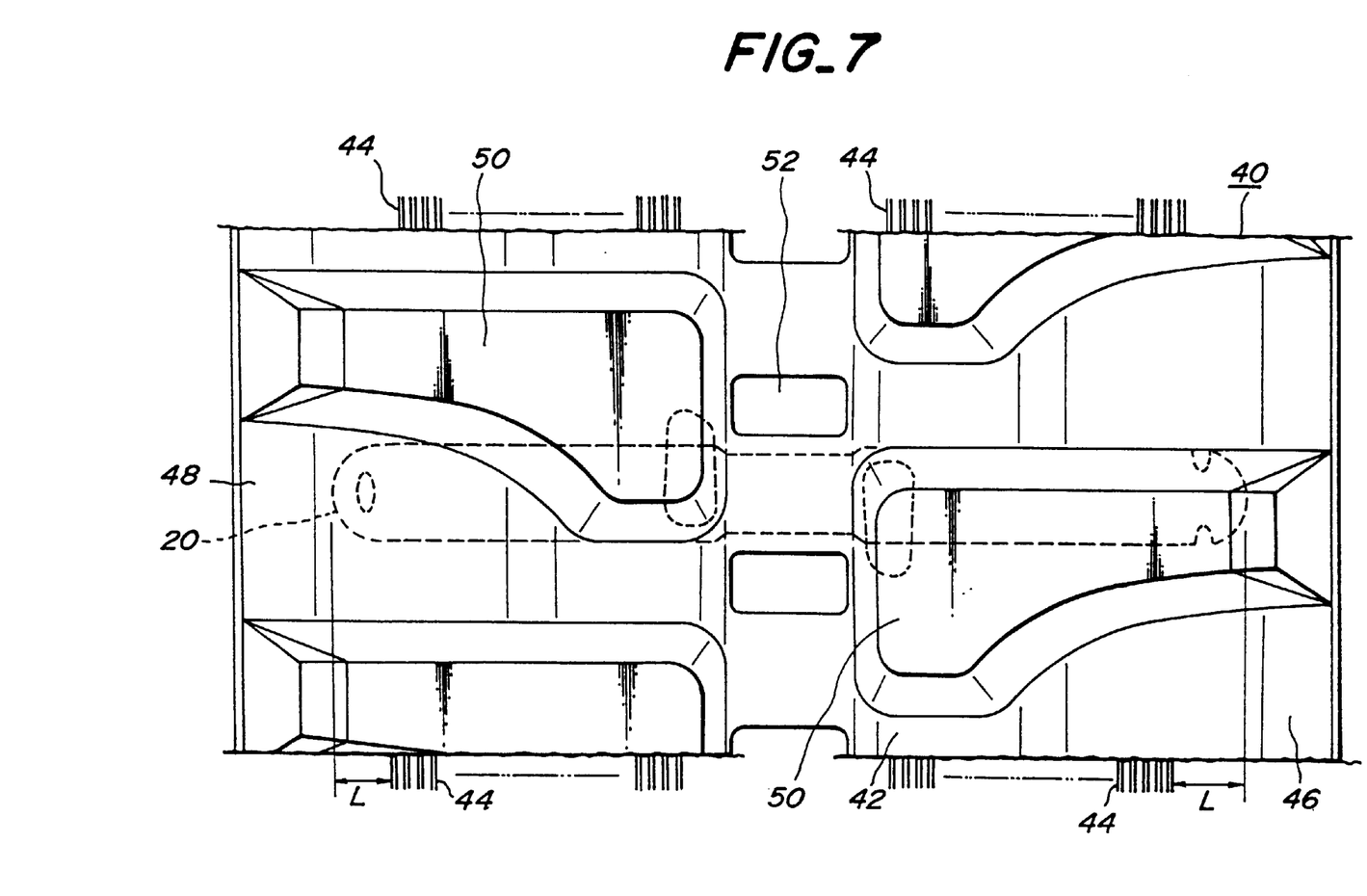
FIG. 7 is a bottom view of the first embodiment of the rubber crawler.
Figure 8:
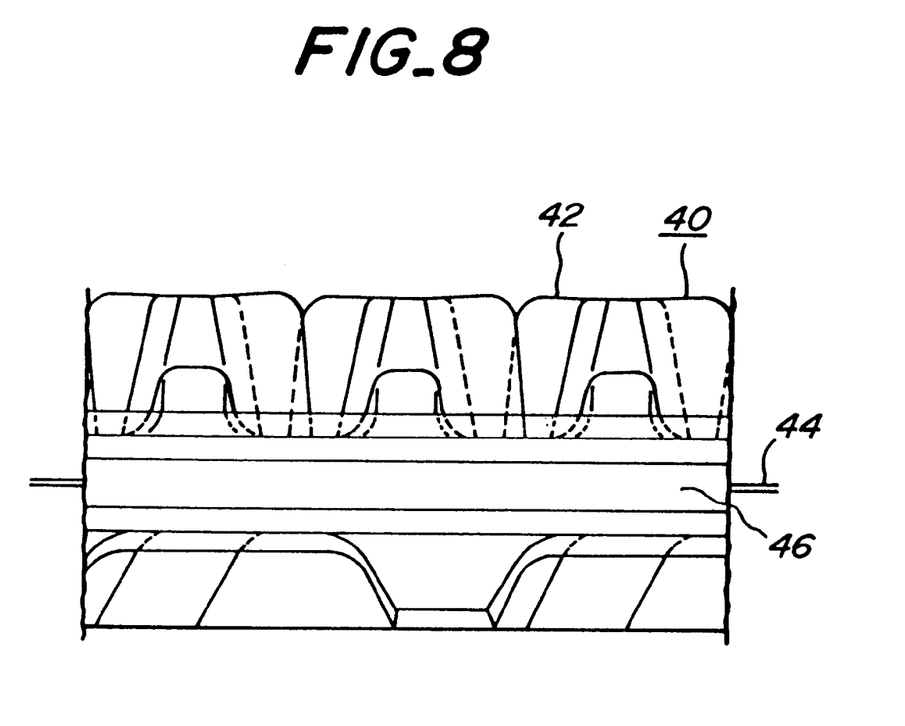
FIG. 8 is a right side view of the first embodiment of the rubber crawler.
Figure 9:
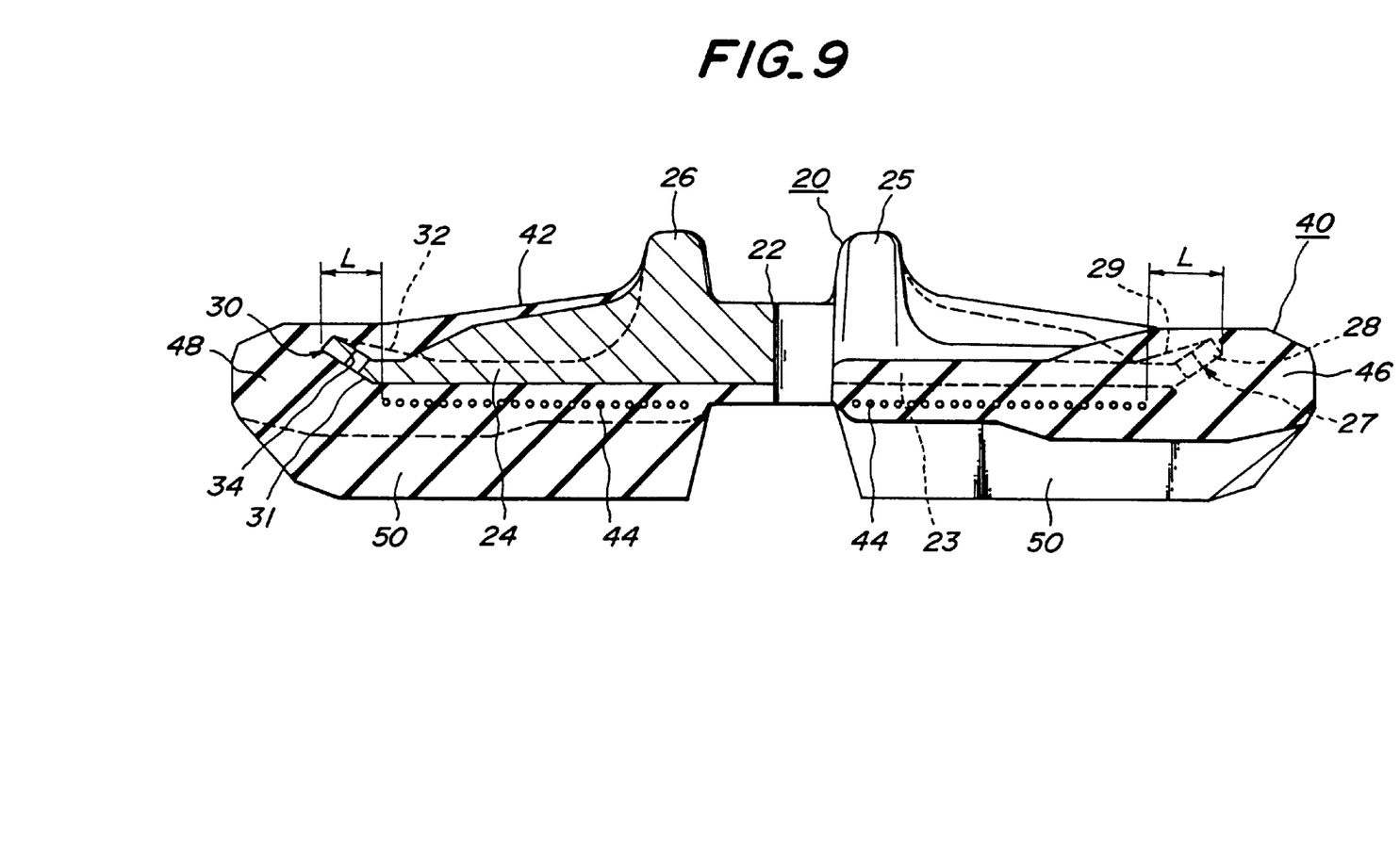
FIG. 9 is a section view of the first embodiment of the rubber crawler taken along a line IX—IX of FIG. 6.

A first embodiment (40) of the first type rubber crawler according to the invention using the metal core 20 shown in FIGS. 4–5 is shown as a plan view in FIG. 6, as a bottom view in FIG. 7, as a right side view in FIG. 8 and as a section view in FIG. 9, respectively.

In the rubber crawler 40, numeral 42 is an endless rubber elastomer buried with a plurality of the metal cores 20 at a given pitch in the longitudinal direction thereof. A row of steel cords 44 arranged side by side are buried in the rubber elastomer 42 along a bottom surface of the wing portions 23, 24 of the metal core 20 in the longitudinal direction of the rubber elastomer 42. Therefore, widthwise end portions 46, 48 made of only rubber are formed outward from both ends of the metal core 20 in the rubber elastomer 42. Moreover, numeral 50 is a rubber lug formed on the outer peripheral surface of the rubber elastomer 42 at a side of contacting with ground and numeral 52 is a sprocket hole defined between the sprocket engaging portions 22 of the adjacent metal cores 20 in which sprocket teeth (not shown) of a driving wheel (not shown) bite therein.

As shown in FIG. 9, rubber constituting the widthwise end portions 46, 48 is adhered to the bow-shaped sections 27, 30 formed in the longitudinal ends of the metal core 20, so that the adhesion area is widened to increase the adhesion strength. Further, when the rubber crawler 40 contacts with or rides on a curb of a footpath or the like, shearing force does not concentrate in rubber of the widthwise end portion 46, 48 owing to the presence of the bow-shaped sections 27, 30. Hence the occurrence of a crack in the widthwise end portion 46, 48 is reduced to prevent the breakage of the widthwise end portion 46, 48.

Furthermore, each of outermost steel cords 44 in the steel cord row is located inward from the longitudinal end of the wing portions 23, 24 of the metal core 20 by a given distance L of not less than 15 mm. Even if the crack is caused in the vicinity of the bow-shaped section 27, 30, it does not arrive at the outermost steel cord 44 in the steel cord row and hence the growth of the crack in the longitudinal direction of the rubber crawler is not caused.

As shown in FIG. 5, the inclination angle $\alpha$ of the bent portion 31 with respect to the outer horizontal face of the metal core 20 is about 30°, whereby the rubber thickness in the widthwise end portion of the rubber elastomer is increased to separate away a position of crack concentration from the widthwise end of the metal core in the widthwise end portion of the rubber elastomer.

As a concrete example of the metal core 20, the distance between the longitudinal ends of the metal core 20 is 290 mm, and the width of the metal core 20 is 30 mm, and the length of the sprocket engaging portion 22 between the projections 25 and 26 is 46 mm, and the height of the sprocket engaging portion 22 from the bottom is 27 mm. The projection 25, 26 has the width at top of 15 mm and the height from the bottom of 50 mm. The thickness of the wing portion 23, 24 in the vicinity of the slant portion 28, 31 is about 3.7 mm. The slant portion 28, 31 has an inclination angle of 20–40° with respect to the horizontal face of the wing portion 23, 24 and a length of about 10–25 mm. Furthermore, the slant portion 29, 32 is formed in each of front and back edges of the wing portion 23, 24 at a position located inward by about 50 mm from an end of the wing portion 23, 24 to be integrally united with the slant portion 28, 31.

Figure 10:
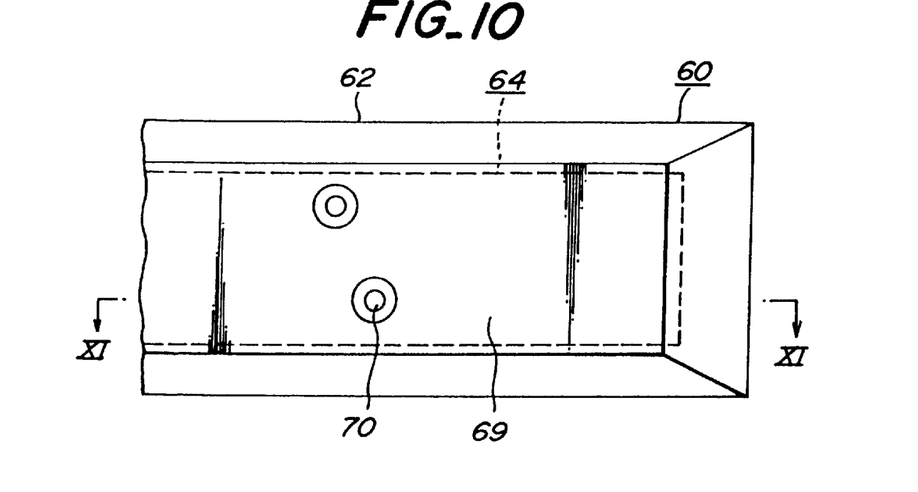
FIG. 10 is a partial bottom view of a second embodiment of the rubber crawler according to the invention.
Figure 11:
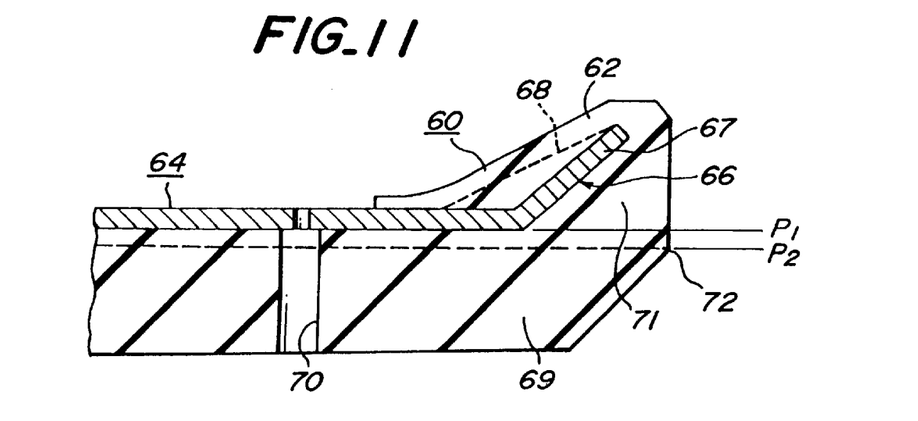
FIG. 11 is a partial section view of the second embodiment of the rubber crawler taken along a line XI—XI of FIG. 10.
Figure 12:
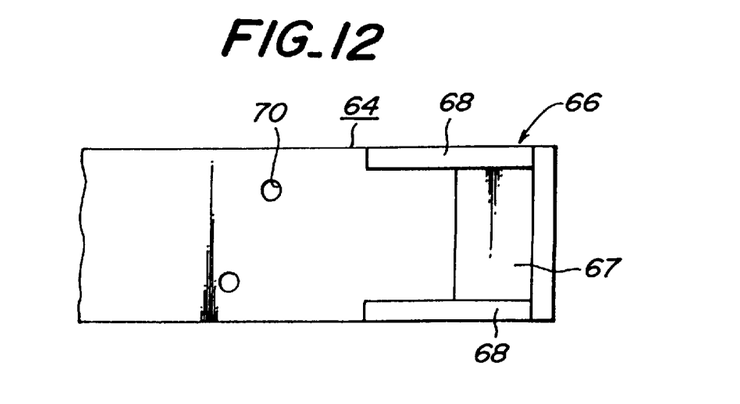
FIG. 12 is a partial plan view of a second embodiment of the metal core used in the second embodiment of the rubber crawler.

As a second embodiment of the rubber crawler according to the invention, a crawler block 60 used in the second type rubber crawler is shown as a partial bottom view in FIG. 10 and as a partial section view in FIG. 11. A second embodiment of a metal core 64 used in the crawler block 60 is shown in FIG. 12 as a partial plan view. The crawler block 60 comprises a rubber elastomer 62 as a rubber pad, a metal core 64 buried in the rubber elastomer 62 and provided at its widthwise end with a bow-shaped section 66 consisting of a slant portion 67 and slant portions 68, and a rubber lug 69 formed on the outer surface of the rubber elastomer 62. Numeral 70 is a bolt hole formed in the metal core 64 and the rubber lug 69. The crawler block 60 is fixed to a link (not shown) by bolt and nut (not shown) through the bolt hole 70.

When the metal core 64 is buried in the rubber elastomer 62, since the bow-shaped sections 66 are formed in both ends of the metal core 64, a thickening portion 71 is formed in a widthwise end portion of the rubber elastomer 62 so as to cover the bow-shaped section 66. And also, an edge 72 of a flat end face of the rubber elastomer 62 in the widthwise direction thereof is located ($P_2$) outward from a horizontal position $P_1$ of an outer horizontal face of the metal core 64, whereby the rubber thickness in the widthwise end portion of the rubber elastomer is increased to separate away a position of crack concentration from the widthwise end of the metal core 64 in the widthwise end portion of the rubber elastomer 62.

Figure 13:
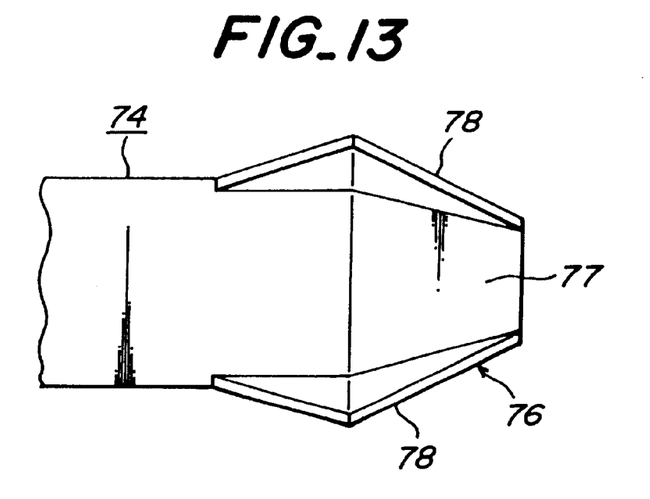
FIG. 13 is a partial plan view of a third embodiment of the metal core used in the rubber crawler according to the invention.
Figure 14:
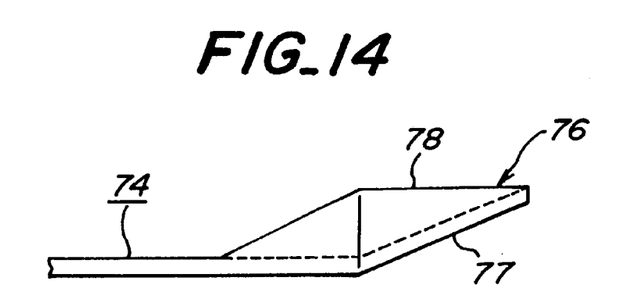
FIG. 14 is a partial front view of the third embodiment of the metal core.
Figure 15:
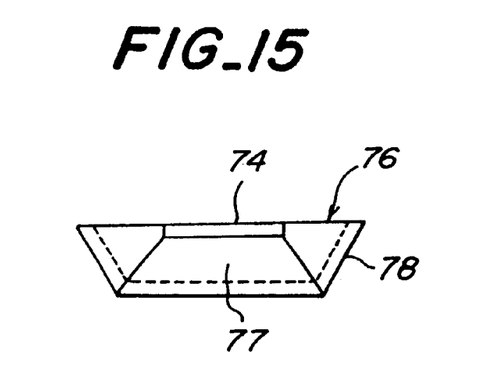
FIG. 15 is a right side view of the third embodiment of the metal core.

A third embodiment (74) of the metal core is shown as a partial plan view in FIG. 13, as a partial front view in FIG. 14 and as a right side view in FIG. 15 and used in a crawler block of the second type rubber crawler (not shown) according to the invention. The metal core 74 is provided at its longitudinal end with a bow-shaped section 76 defined by a slant portion 77 extending upward from the longitudinal end of the metal core toward an inner peripheral side of the crawler and a pair of slant portions 78 vertically stand from front and back edges of the metal core in the vicinity of a start point of the bent portion 77 and spreading outward and converging inward from a position corresponding to the start point. Preferably, the entire outer face of the bow-shaped section 76 may be rounded.

Figure 16:
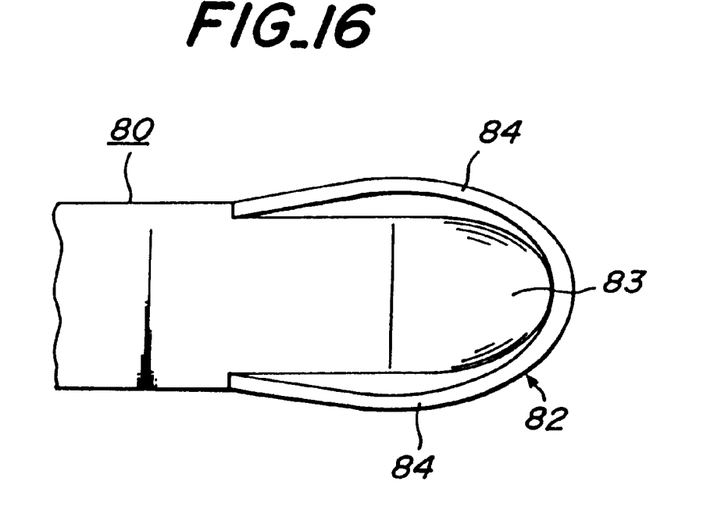
FIG. 16 is a partial plan view of a fourth embodiment of the metal core used in the rubber crawler according to the invention.
Figure 17:
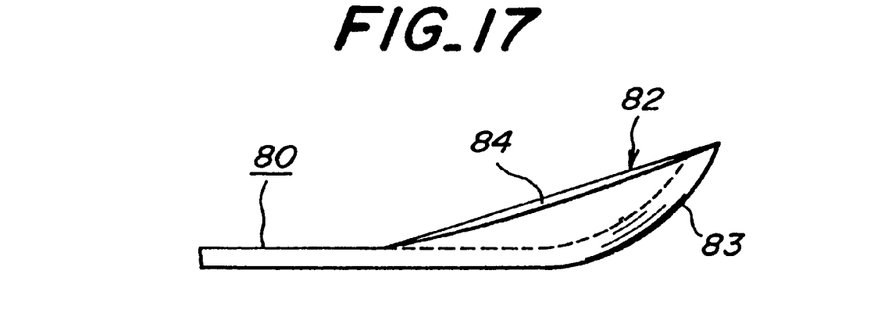
FIG. 17 is a partial front view of the fourth embodiment of the metal core.
Figure 18:
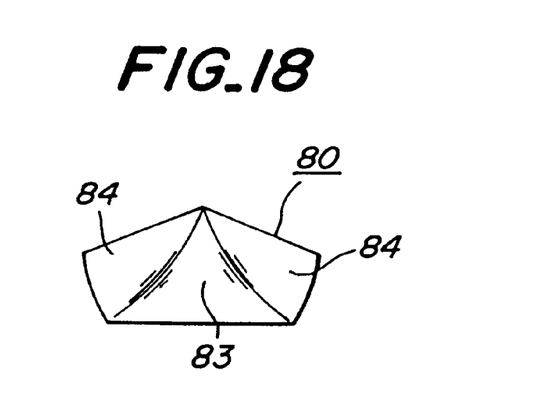
FIG. 18 is a right side view of the fourth embodiment of the metal core.

A fourth embodiment (80) of the metal core is shown as a partial plan view in FIG. 16, as a partial front view in FIG. 17 and as a right side view in FIG. 18 and used in a crawler block of the second type rubber crawler (not shown) according to the invention. The metal core 80 is provided at its longitudinal end with a bow-shaped section 82 defined by a curved slant portion 83 curvedly extending upward from the longitudinal end of the metal core toward an inner peripheral side of the crawler and a curved slant portion 84 vertically stands from front and back edges of the metal core in the vicinity of a start point of the slant portion 83 and curvedly extending from the front edge to the back edge to have a maximum distance at a position corresponding to the start point in the widthwise direction of the metal core.

Figure 19:
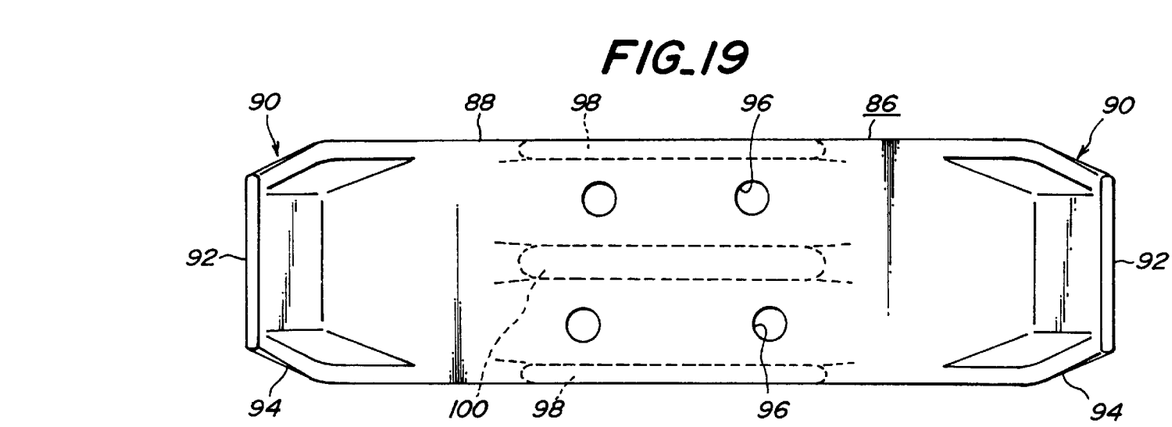
FIG. 19 is a plan view of a fifth embodiment of the metal core used in the rubber crawler according to the invention.
Figure 20:
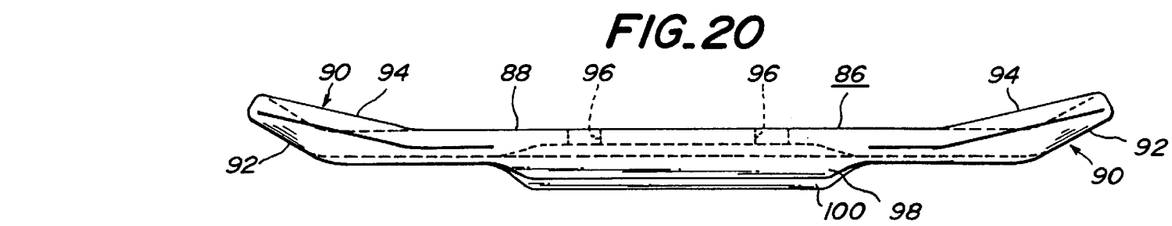
FIG. 20 is a front view of the fifth embodiment of the metal core.
Figure 21:
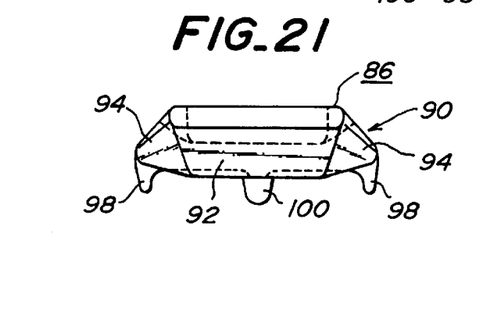
FIG. 21 is a right side view of the fifth embodiment of the metal core.

A fifth embodiment (86) of the metal core is shown as a plan view in FIG. 19, as a front view in FIG. 20 and as a right side view in FIG. 21 and used in a crawler block of the second type rubber crawler (not shown) according to the invention. The metal core 86 comprises a main body portion 88, and a pair of bow-shaped sections 90 formed on both longitudinal ends of the main body portion 88 and each consisting of a slant portion 92 formed by inclining each longitudinal end of the main body portion toward an inner peripheral side of the crawler block and a pair of slant portions 94 formed by inclining front and back edges of the main body portion near the longitudinal end thereof toward the inner peripheral side of the crawler block. Numeral 96 is a bolt hole formed at a central zone of the main body portion 88 in place for fixing the crawler block to a link (not shown) by bold and nut (not shown) through the bolt hole. Numerals 98 and 100 are rib portions formed on a surface of the main body portion 88 facing to ground at the central zone thereof to sandwich the bolt hole between the rib portions 98 and 100 for protecting a bolt head or nut projected from the bold hole 96.

As mentioned above, according to the invention, even in the first type and second type rubber crawlers, a specified means is applied to a widthwise end portion of a metal core buried in a rubber elastomer to prevent the occurrence of a crack in the widthwise end portion made of only rubber and the breakage of the widthwise end portion accompanied with the growth of the crack in the longitudinal direction of the rubber elastomer or a direction directing to a ground contact face when the rubber crawler contacts with or rides on protrusions such as pebbles, stone pieces, and the like scattered on a running road or a curb of a footpath. Consequently the durable life of the rubber crawler can be considerably improved.

What is claimed is:

1. A rubber crawler comprising; a rubber elastomer constituting a main body of the crawler, said crawler having an outer peripheral face on said rubber elastomer, an inner peripheral side and a ground contacting side, at least one metal core buried in the rubber elastomer and extending in a widthwise direction perpendicular to a running direction of the crawler, said at least one metal core having an outer peripheral face, and at least one rubber lug formed on said outer peripheral face of the rubber elastomer, wherein each widthwise end portion of the metal core and front and back edge portions near to the widthwise end thereof in the running direction are inclined at said ground contacting side toward said inner peripheral side of the crawler to form a bow-shaped section in each of both widthwise ends of the metal core.

2. A rubber crawler according to claim 1, wherein the rubber elastomer is an endless rubber belt or a rubber pad.

3. A rubber crawler according to claim 1, wherein said bow-shaped section has an inclination angle with respect to said outer horizontal peripheral face of the at least one metal core that is in the range of 15–45°.

4. A rubber crawler according to claim 3, wherein the inclination angle is 20–35°.

5. A rubber crawler according to claim 1, wherein a length of the rubber lug in the widthwise direction at the ground contacting face is longer than a distance between the bow-shaped sections at both widthwise ends of the metal core.

6. A rubber crawler according to claim 1, wherein a rubber protruding portion covering each of the bow-shaped sections of the metal core is formed on an inner peripheral side of the crawler.

7. A rubber crawler according to claim 1, wherein the bow-shaped section is configured to define an outside-inside path.

8. A rubber crawler according to claim 1, wherein said at least one metal core has an inclination angle of the widthwise end in the bow-shaped section with respect to an outer horizontal face thereof is 15–45° and said at least one metal core has front and back edges and an inclination angle of each of the front and back edges of the metal core in the bow-shaped section is approximately 90°.

9. A rubber crawler according to claim 1, wherein when the rubber elastomer is an endless rubber belt, a row of plural steel cords arranged side by side is buried in the rubber elastomer along an outer surface of the metal core extending said steel cords in the circumferential direction of the rubber elastomer and each of outermost steel cords in the steel cord row is located inward from the widthwise end of the metal core by not less than 15 mm.

10. A rubber crawler according to claim 1, wherein said rubber elastomer has a plane surface in a widthwise end portion of the rubber elastomer with an edge fcing toward the ground and is located outward from an outer surface of the metal core.

* * * * *